United States Patent [19]
Jacobsson

[11] 3,744,918
[45] July 10, 1973

[54] APPARATUS FOR CORRELATION SPECTROSCOPY

[75] Inventor: Jan Roland Jacobsson, Taby, Sweden

[73] Assignee: AGA Aktiebolag, Lidingo, Sweden

[22] Filed: Apr. 23, 1971

[21] Appl. No.: 136,739

[30] Foreign Application Priority Data
Apr. 30, 1970 Sweden.............................. 6001/70

[52] U.S. Cl.................... 356/188, 250/218, 356/74, 356/97
[51] Int. Cl............................. G01j 3/02, G01j 3/50
[58] Field of Search...................... 250/43.5 R, 218; 356/93–95, 96–98, 188, 51, 74, 205

[56] References Cited
UNITED STATES PATENTS
3,694,086  9/1972  May........................................ 356/51
2,775,160  12/1956  Foskett et al.............. 250/43.5 R X

FOREIGN PATENTS OR APPLICATIONS
930,698  7/1963  Great Britain................. 250/43.5 R Primary Examiner—Ronald L. Wibert
Assistant Examiner—F. L. Evans
Attorney—Larson, Taylor & Hinds

[57] ABSTRACT

Arrangement for correlation spectroscopy by means of the absorption or emission spectrum of a gas. Light from the gas is arranged to be fed to an analyzer, comprising a light transmitting disc arranged in front of a detector. One side of the disc is supplied with an interference filter which within at least one segment of the filter has transmission characteristics as a function of the wavelength within a determined range of wavelengths. The range of wavelengths corresponds to the absorption or emission spectrum of a searched ingredient in the gas. The other parts of said filter have different transmission characteristics. These parts have different transmission characteristics relative to one another and are arranged to be alternatively inserted into the beam path in front of the detector.

8 Claims, 9 Drawing Figures

Patented July 10, 1973                                   3,744,918
2 Sheets-Sheet 1
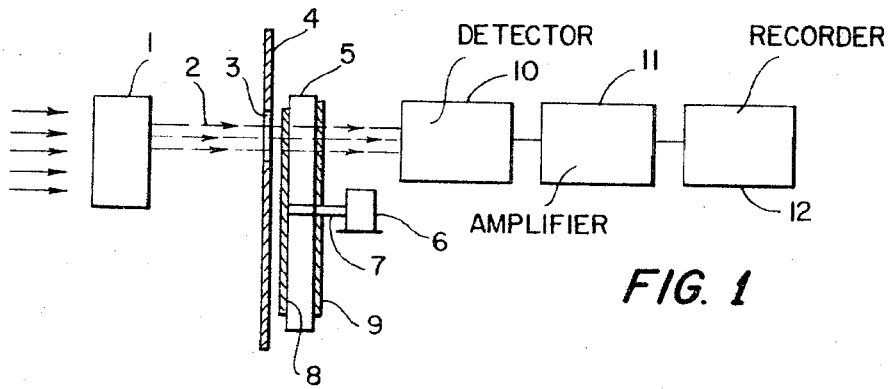
FIG. 1
FIG. 2
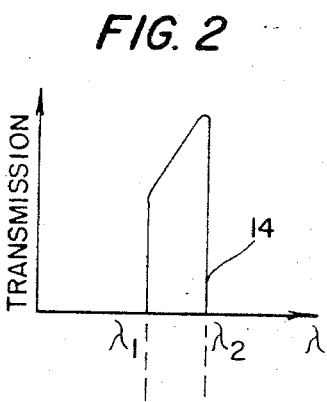
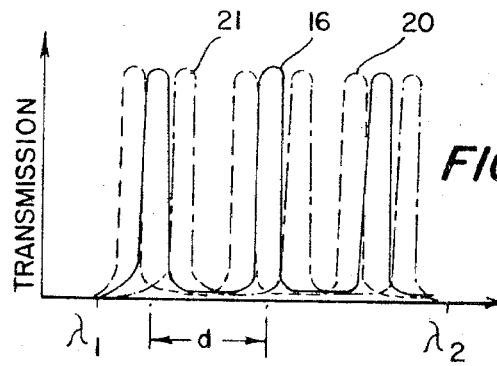
FIG. 4
FIG. 3
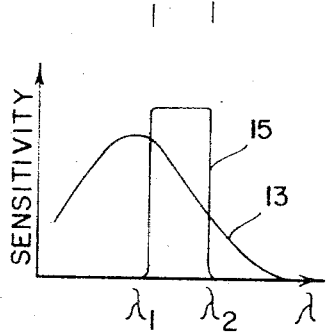
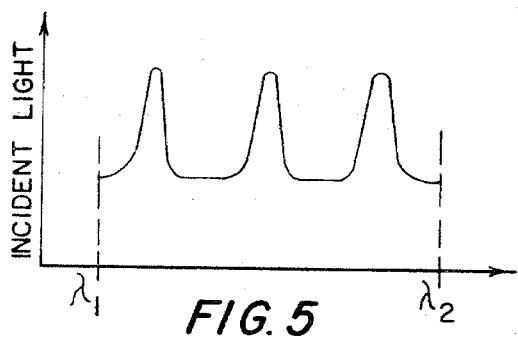
FIG. 5
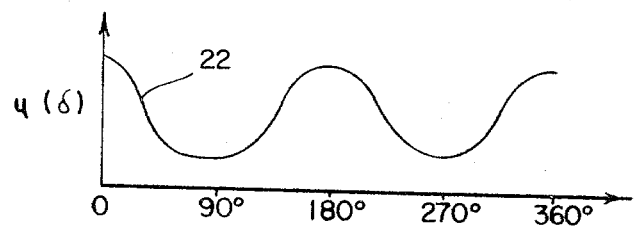
FIG. 6
INVENTOR
JAN R. JACOBSSON
BY Larson, Taylor and Hinds
ATTORNEYS Patented July 10, 1973

INVENTOR
JAN R. JACOBSSON

BY Larson, Taylor and Hinds

ATTORNEYS

3,744,918

APPARATUS FOR CORRELATION SPECTROSCOPY

The present invention relates to an apparatus for spectrochemical analysis, such as chemical identification and quantitative analysis of materials by using absorption spectra, fluorescence spectra or emission spectra which characterize the different materials. The apparatus can for instance be used for analysis of a gas to indicate certain components, the light from the gas being arranged to be fed to an analyzer.

In a conventional spectrophotometer the light which is to be analyzed is divided into a spectrum with the aid of a dispersing element such as a prism or a grating, whereupon, after suitable focussing, the intensity of the light is analyzed at certain wavelengths. In connection with this analysis a correlation filter in the form of a mechanical mask may be used which filter corresponds to the spectral characteristic of the light within a certain range of wavelengths for a certain material, the presence of which is to be determined. The tolerances for the motion of such a mask are, as a matter of fact, extremely critical.

By using the present invention, the possibility of correlation spectroscopy is obtained with an apparatus, the construction of which is much simpler and cheaper and, furthermore, a more secure and reliable result is obtained. This is due to the fact that, according to the present invention, a mechanical mask is not necessary for scanning.

According to the present invention, the analyzer, to which the light is fed, comprises a light transmitting disc arranged in front of a detector. One side of the disc is supplied with an interference filter which within at least one segment of its surface has transmission characteristics which are a function of the wavelength within a certain range of wavelengths, such that the transmission of the filter in said range of wavelengths corresponds to the absorption or emission spectrum for the material, the presence of which is to be determined. The rest of the filter has transmission characteristics which differ from that transmission. Furthermore, the parts of the filter with different characteristics also have different transmission characteristics relative to one another and are arranged to be alternatively inserted in the beam path to the detector.

The invention is described below in accordance with the accompanying drawing where FIG. 1 shows a diagrammatic view of the apparatus.

FIGS. 2–6 are diagrams showing the function and construction of the apparatus.

Figure 8:
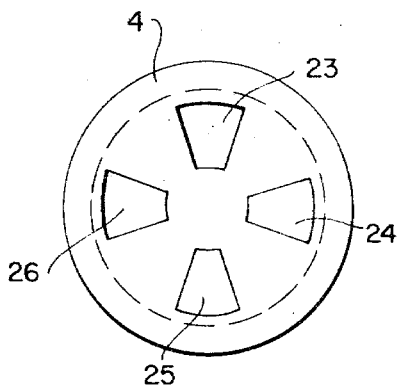
Figure 9:
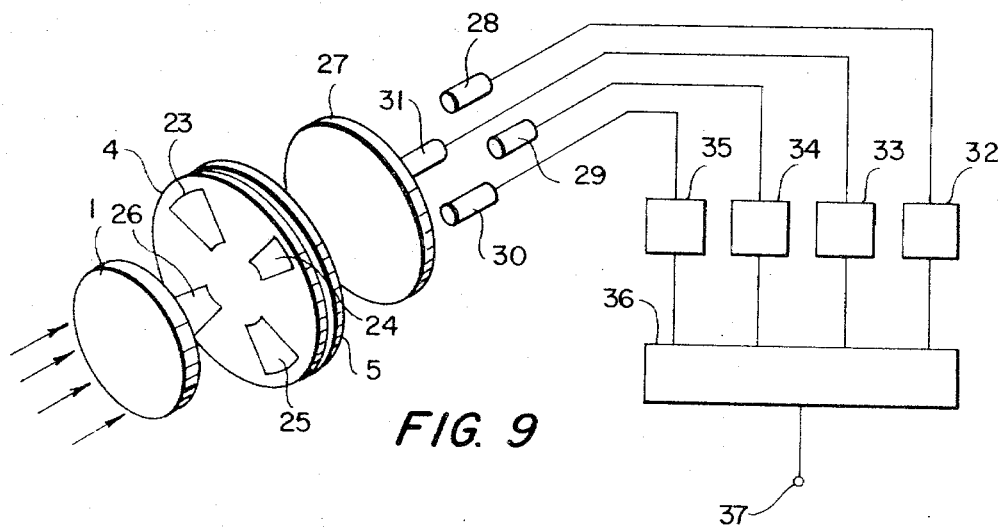

FIG. 9 schematically shows a system comprising an element according to FIG. 8.

Figure 7:
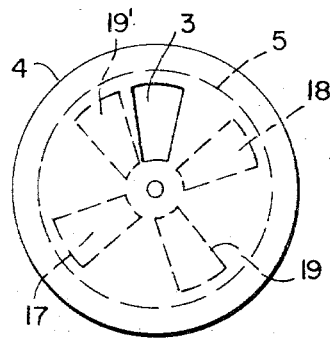
FIGS. 7 and 8 show two embodiments of an element of the apparatus.

The light which is to be analyzed is, according to FIG. 1, fed to an optical system 1, the function of which is to collect the light and concentrate it against an opening 3 in a fixed aperture member 4 and to obtain an outgoing lightbeam 2 consisting of substantially parallel light. This lightbeam passes through the opening 3. This opening is, as shown in FIG. 7, segment shaped. The light then hits a light transmitting disc 5, which by a motor 6 is arranged to rotate on axis 7. The disc is provided on its sides with filters 8 and 9 which are to be further described below. The light passing through the disc 5 supplied with filters is fed to a detector 10 and the electrical signal generated in the detector can via a conventional amplifier 11 be supplied to a recorder means 12 known per se.

The filters 8 and 9 are of the interference filter type and are different in construction and function from one another. Filter 8 serves as a blocking and/or compensation filter and is in this embodiment used to compensate for the spectral sensitivity characteristics of the detector. If it is thus assumed that the sensitivity of the detector according to the wavelength of the incident light follows curve 13 in FIG. 3 and it is furthermore provided that the range of wavelength $\lambda_1 - \lambda_2$ is of interest in connection with the analysis of the analyzed gas, filter 8 is to be made so that it has a transmission according to curve 14 in FIG. 2. A combination of filter 8 and detector 10 gives as a resulting sensitivity curve 15 in FIG. 3, which curve is substantially straight within the range of wavelengths $\lambda_1 - \lambda_2$.

Filter 9 is a circularly variable interference filter, that is, one in which the transmission characteristics vary circumferentially around the axis of rotation of the filter. The interference spectrum of certain segments of the filter substantially corresponds to the absorption spectrum of the ingredient in the gas which is to be analyzed. Thus, if the intensity of the incident light within the range $\lambda_1 - \lambda_2$ follows the curve shown in FIG. 5, the transmission for certain segments (described below) of filter 9 within the same range of wavelength $\lambda_1 - \lambda_2$ follows the continuous curve 16 in FIG. 4. A comparison of FIGS. 4 and 5 indicates that for these parts of the filter the transparence is maximum for the wavelengths where the intensity for the incident light is a maximum.

The position of the parts of filter 9, having transmission characteristics according to curve 16 is shown in FIG. 7. This figure shows in one plane the aperture 4 with an opening 3 and the disc 5 indicated behind. Two segments 17 and 18 denoted with dashed lines are positioned on filter 9 diametrically opposite one another. Each segment has transmission characteristics approximately according to curve 16 in FIG. 4. When thus anyone of these segments of the filter is behind the opening 3, a maximum will occur for the light falling on the detector 10.

The interjacent parts of filter 9 have transmission characteristics differing from the characteristic of curve 16. In this embodiment a segment 19 which is displaced 90° in relation to segments 17 and 18 has transmission characteristic according to the dotted curve 20 in FIG. 4. A further segment 19' of filter 9 which is diametrically placed in relation to segment 19 has transmission characteristics according to the dash-dotted curve 21 in FIG. 4.

As is evident from FIG. 4, curves 16, 20 and 21 have substantially the same shape but are so displaced to each other that transmission maxima according to curves 20 and 21 with respect to the wavelength are situated on each side of transmission maximum for curve 16. Alternatively, instead of filter 9 being provided with discrete segments, a filter can be provided with a continuously varying transmission characteristic circularly along the filter. Thus, filter 9 is provided with a continuous passage of transmission characteristics existing for the parts of the filter between part 17 and parts 18, and 19, respectively. Due to known relationships in correlation spectroscopy, when disc 5 with the filters is brought into rotation, the intensity of the light falling onto detector 10 will follow curve 22 in FIG. 6 as a consequence of the described embodiment of the apparatus. FIG. 6 thus shows the variation the signal $\mu(\delta)$ from detector 10 as a function of the turning of disc 5 in relation to a certain reference direction. Details of the known relationships are given, for example, in "Applied Optics", Volume 7, No. 4, April, 1968, pages 607–616. Curve 22 represents an AC-current superposed on a DC-current and the AC-current can in a well-known manner be amplified in amplifier 11 and then registered with the register means 12. As is evident from the description, such an AC-current is received if the analyzed gas contains an ingredient, the spectrum of which corresponds to the transmission characteristics according to the curve of FIG. 4.

If the gas is analyzed in respect to another ingredient, disc 5 with filter 9 should be replaced by another disc supplied with an interference filter which is adapted to this other ingredient.

Interference filters 8 and 9 can be made by controlled volatilization in vacuum on a substrate so that the desired transmission characteristics within a certain range of wavelength is obtained. In doing so one starts from a spectrum measured in advance for the ingredient in question, which spectrum can be an absorption or emission spectrum. In some cases it is suitable that disc 5 forms the interference filter 9, the thickness of which can be varied along the periphery so that a continuous variation of transmission characteristics is obtained.

In the other embodiment of the invention shown in FIG. 8, the rotatable filter member is positioned behind aperture member 4 which has four openings 23–26. It is here assumed that filter 9 arranged on the rotatable disc is made so that the transmission characteristics for each of the four parts of the filter which at a certain turning angle are situated behind the openings 23–26, are in accordance with curve 16 in FIG. 4. Interjacent parts have now in two directions diametrical to each other transmission characteristics according to curve 20, while the perpendicular parts have transmission characteristics according to curve 21.

Arrangements to use the light passing the disc with its filters as shown in FIG. 8 can be constructed as is indicated in FIG. 9. According to this embodiment the light which is to be analyzed falls against the above-mentioned optical system 1, from which parallel light is supplied to the rotating disc 5 through the aperture member 4 with four openings 23–26 indicated in the figure. Further on in the beam path another optical system 27 is arranged and behind this four detectors 28–31 are arranged. Each of these is via phase shifters 32–35 connected to an adder 36 from the output 37 of which a signal is obtained which is the sum of the signals generated in the detectors 28–31. The variation of this output signal with respect to the turning of the disc 5 is an analogue of curve 22 in FIG. 6 except that maxima of the signal occur at a mutual distance of 90°.

Disc 5 with filters 8 and 9 does not need to be rotatable as is shown in the embodiment. Other arrangements are also possible within the scope of the invention to provide that the parts of the filter with different transmission characteristics are inserted alternatively in the beam path in front of the detector, such as by giving the filter an oscillating motion. In that event, the filter could be placed on a rectangular substrate and the variations between curves 16, 20 and 21 in FIG. 4 are provided along a straight line, which is preferably parallel to the long side of the rectangle.

Furthermore, filters 8 and 9 do not need to be placed on the same substrate. If they are placed on different substrates, at least one of the filters must be circularly variable when the variation of the transmission is obtained in the way shown in FIG. 1, i.e. by means of a rotating filter.

The remaining filters can be placed on one or more separate substrates, which do not necessarily have to rotate together with the circularly variable filter.

It is obvious that the number of openings in the fixed aperture 4 according to FIG. 9 is not limited to four, and a greater number of openings can be arranged combined with the corresponding number of detectors.

Finally, it can be mentioned that the variation between curves 21, 16 and 20 in FIG. 4 can be greater than is shown. If the variation is greater than d according to FIG. 4 for a periodical spectrum of a sample, for instance a gas, the frequency of the signal will be an even multiple of the frequency of the incident signal which may lead to an increased selectivity.

I claim:

1. In correlation spectroscopy apparatus wherein the presence of a material is determined by the analysis of the absorption or emission spectrum of a material wherein said spectrum is fed to an analyzer, the improvement wherein said analyzer comprises light detector means positioned to detect a light beam comprising said spectrum, means for passing a predetermined wavelength band of said spectrum to said light detector means and a light filter member disposed to intercept said light beam, said light filter member having a first portion having a light transmission characteristic curve within said wavelength band comprising a plurality of light-transmission maxima and minima and corresponding to the maxima and minima of said predetermined wavelength band of said spectrum of the material being analyzed, having a second portion having a light transmission characteristic curve within said wavelength band having substantially the same shape as the light transmission characteristic curve of said first portion but displaced along the wavelength axis in the direction of shorter wavelength, and having a third portion having a light transmission characteristic curve within said wavelength band having substantially the same shape as the light transmission characteristic curve of said first portion but displaced along the wavelength axis in the direction of longer wavelength, and means to sequentially insert said first, second and third portions in said light beam such that said second and third portions are inserted alternately and said first portion is inserted after said second portion and after said third portion.

2. Correlation spectroscopy apparatus according to claim 1 wherein said filter member has at least two discrete first portions, one of said discrete first portions being inserted in said light beam after said second portion, the other of said discrete first portions being inserted in said light beam after said third portion.

3. Correlation spectroscopy apparatus according to claim 2 wherein said filter member comprises a member rotatable on an axis generally parallel with said light beam.

4. Correlation spectroscopy apparatus according to claim 3 wherein the transmission characteristics of said filter member are continuously variable circumferentially of said axis.

5. Correlation spectroscopy apparatus according to claim 1 further including compensating filter means to compensate for variations in the sensitivity of said detector means as a function of wavelength within said predetermined wavelength band.

6. Correlation spectroscopy apparatus according to claim 5 wherein said compensating filter is positioned on the side of said filter member remote from said detector.

7. Correlation spectroscopy apparatus according to claim 2 including a plurality of detector means, the number thereof corresponding to the number of said discrete first portions of said filter member.

8. Correlation spectroscopy apparatus according to claim 7 further including means to record the total light detected by said plurality of detectors.

* * * * *